Oct. 1, 1929.   J. S. GUEST   1,729,662

COMBINED WAFFLE IRON AND COOKING APPARATUS

Filed Dec. 22, 1927

INVENTOR.
JOHN S. GUEST
BY A. B. Bowman
ATTORNEY

Patented Oct. 1, 1929

1,729,662

UNITED STATES PATENT OFFICE

JOHN S. GUEST, OF LOS ANGELES, CALIFORNIA

COMBINED WAFFLE IRON AND COOKING APPARATUS

Application filed December 22, 1927. Serial No. 241,762.

My invention relates to a combined electric waffle iron, or similar apparatus, and an electric cooking apparatus.

The objects of my invention are: first, to provide an apparatus of this class whereby waffles or similar food stuffs may be made simultaneously with the cooking of coffee, frying of eggs, or the like, at the upper side of the apparatus; second, to provide an apparatus of this class whereby heat from the waffle baking element is utilized in warming or heating receptacles positioned on the upper side of the apparatus, thus utilizing heat which is otherwise lost; third, to provide an apparatus of this class which is provided with an additional heating element at its upper side for cooking or frying other edibles while baking waffles, or the like; fourth, to provide an apparatus of this class having a plurality of separate heating elements for heating the opposite sides of a waffle iron and for forming an additional hot plate at the upper side of the apparatus, all of which heating elements may be interchanged when desired in case one is worn out; fifth, to provide an apparatus of this class in which the hot plate or heating means for the upper side of the apparatus is provided with a cover which may be latched in a downward position or in an upright position, and when latched in said upright position may serve as a platform for supporting the receptacle, placed on the hot plate, or heating means, when the waffle is baking, in case and when it is desired to remove the baked waffle, or to pour other waffle batter between the waffle irons; sixth, to provide an apparatus of this class which may be easily controlled so that only the waffle iron may be used and edibles kept warm at the top, or so that only the hot plate may be used; seventh, to provide as a whole a novelly constructed and arranged apparatus of this class; and, eighth, to provide an apparatus of this class which is simple and economical of construction, efficient and which will not readily deteriorate or get out of order.

Figure 1:
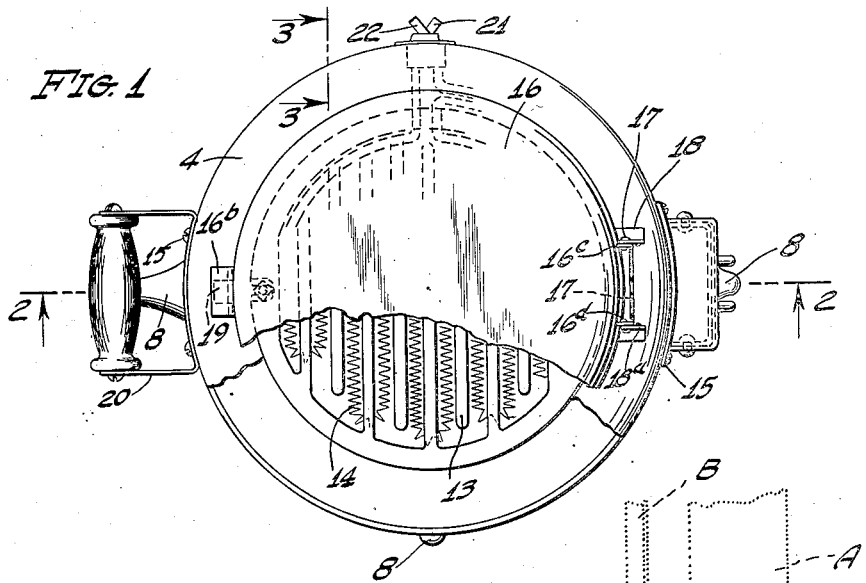
Figure 2:
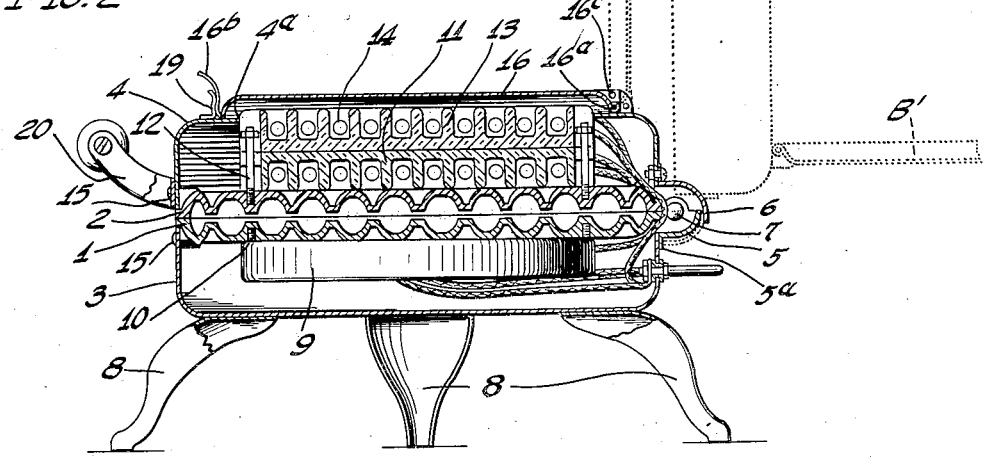
Figure 3:
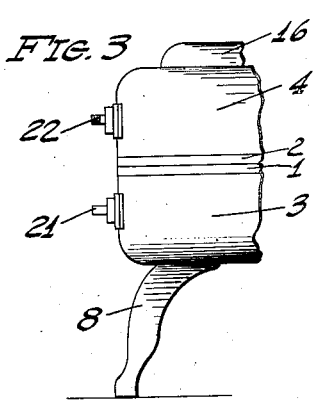
Figure 4:
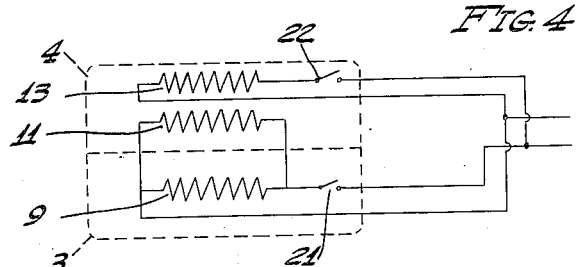

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a top view of my apparatus in its preferred form of construction, showing certain portions thereof broken away and in section to facilitate the illustration; Fig. 2 is a sectional elevational view thereof taken through 2—2 of Fig. 1; Fig. 3 is a fragmentary elevational view thereof taken at 3—3 of Fig. 1, showing particularly the arrangement of the electric control switches; and, Fig. 4 is a diagrammatic view, showing the wiring of my apparatus in its preferred form.

Like characters of reference refer to similar parts and portions throughout the several views of the drawings.

The waffle baking portion of my apparatus, consisting essentially of the waffle forming members 1 and 2, casing members 3 and 4 positioned and secured, respectively, over the outer sides of the waffle forming members 1 and 2, hinge members 5 and 6 secured to the outer sides of the casing members 3 and 4, respectively, the pivot pins 7 connecting the hinge members 5 and 6, and the legs 8, are constructed similar to those of waffle irons now in use. The hinge construction and the legs 8 are, however, slightly modified to take care of the improvements of my invention.

Within the casing 3 and to the under side of the waffle forming member 1, is secured a heating unit 9 by means of a pair of bolts 10. Against the upper side of the waffle forming member 2, is also secured a heating unit 11 by bolts 12, the unit 11 being positioned in the reverse order to the heating unit 9. Against the upper side of the unit 11 is positioned another heating unit 13 which is also positioned in reverse order to the heating unit 11 and is secured to the waffle forming member 2 by the same bolts 12. All heating units 9, 11 and 13 are of the same construction and consist of circular discs grooved at one side in which grooves are positioned electric heating elements 14 in the form of wire coils, as shown in Figs. 1 and 2. The discs supporting the heating elements are preferably made from electric insulating material but which may conduct heat to a certain extent so that when the heating unit, or the heating elements in the heating unit 11 are connected with the electric current, the top of the apparatus is also slightly heated. Even though the discs or supporting members for the heating element are made of ordinary insulating material, a certain proportion of the heat which normally passes upwardly and is gone to waste, is here utilized by heating receptacles positioned on the upper side of the heating unit 13 which extends upwardly a slight distance through an opening 4$^a$ in the upper side of the casing 4. These heating units, or heating elements, as I prefer to call them, are provided at their opposite sides with slots and shoulders in said slots which are adapted to receive the bolts 10 and 12 and nuts at the outer ends of the bolts, as shown in Figs. 1 and 2.

The casings 3 and 4 are secured to the edges of the waffle forming members 1 and 2 by screws 15, the screws 15 securing the front side of the casing 4 to the waffle forming member 2 being also employed to secure the handle or lifter 20 to the front side of the movable or tiltable section of the apparatus.

The hinge members 5 and 6 are secured to the rear sides of the casings 3 and 4 by screws 15 which are also employed for securing the rear sides of the casings to the waffle members, or waffle forming members. These hinge members are interacting casings pivoted together at their ends by pins 7, the outer sides of these members being substantially cylindrical with the hinge member 6 fitting over the member 5. The hinge member 6 extends below the horizontal plane passing through the pivotal axis a distance equal, or substantially equal, to the vertical plane passing through the axis from the outer side of the casing 3 or the flange 5$^a$ extending downwardly from the hinge member 5 against the outer side of the casing 3. Such distance, however, is determined upon the position the upper section of the apparatus is to assume when raised, as shown by dotted lines designated A, the hinge member 6 serving as a stop against the downwardly extending flange of the hinge member 5 described above.

When the heating unit, or heating element of the heating unit, 13 is not in use, the same is covered by a cover 16 which is in the form of an inverted dish of shallow construction and larger than the heating unit. One side of the edge of the cover 16 is provided with a hinge portion 16$^a$ which is pivotally connected by a pin 17 to brackets 18 secured to the upper side of the casing 4. The opposite side of the cover 14 is provided with an upwardly extending latch and grip portion 16$^b$ which is adapted to engage a resilient latch 19 also secured to the upper side of the casing 4, for yieldably and frictionally latching the cover over the heating means. The hinge portion 16$^a$ of the cover 16 is provided at its opposite ends with upwardly extending lugs 16$^c$ which may be formed from the hinge portion by bending portions upwardly. These lugs provide means for limiting the upward and backward shifting of the cover 16. The brackets 18 and the lugs 16$^c$ are also preferably provided with interlocking lug and recess portions 18$^a$ and 16$^d$ for yieldably holding the cover 16 in an open position, as indicated by dotted lines designated B and B$^1$ in Fig. 2. It will be noted that when a waffle is being baked between the waffle members, or waffle forming members, 1 and 2 and the heating means at the upper side is employed for frying eggs, or the like, the cover 16 is in the position, as shown by dotted lines and designated B. When desiring to open up the apparatus to remove or to pour in batter for another waffle, the upper section is gripped by the handle 20 and raised to the position, designated A, which shifts the cover to the position designated B$^1$. While the waffle baking portion of the apparatus is open, the receptacle previously placed above the apparatus over the heating means or hot plate portion at the upper side of the same, is temporarily placed on the cover in the position B$^1$ until the upper section of the waffle baking apparatus is again turned downwardly. It will be here also noted that the positioning of a receptacle on the cover B, when in the position B$^1$, is likely to overbalance the apparatus unless the legs 8 are extended a considerable distance outwardly, as shown in Fig. 2; or, if desired, the rear legs may be extended a considerable distance farther backwardly.

The electrical control for the heating element 14 is made by switches 21 and 22 positioned at the sides of the casings 3 and 4, respectively, for controlling, respectively, the heating elements positioned immediately against the waffle members 1 and 2, and the heating element at the upper portion of the casing 4. The wiring diagram for my apparatus is preferably as shown in Fig. 4, in which 9, 11 and 13 are the heating units, or heating elements of the heating units shown in Fig. 2. The switch 21, positioned in the lower casing 3, controls both the units 9 and 11, while the switch 22, positioned in the casing 4, is shown to control the unit 13 only.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an apparatus of the class described, a lower baking member, an upper baking member pivotally connected at one side to one side of the former, casing members enclosing the outer sides of said baking members, an electric heating element positioned adjacent the under side of the lower baking member within the casing positioned therearound, a second similar heating element positioned adjacent the upper side of the upper baking member within the upper casing, and a third heating element of similar construction to the first and second heating elements and positioned adjacent to and in reverse order from the second heating element and extending through the casing positioned around the upper baking member.

2. In an apparatus of the class described, a lower baking member, an upper baking member pivotally connected at one side to one side of the former, casing members enclosing the outer sides of said baking members, an electric heating element positioned adjacent the under side of the lower baking member within the casing positioned therearound, a second similar heating element positioned adjacent the upper side of the upper baking member within the upper casing, a third heating element of similar construction to the first and second heating elements and positioned adjacent to and in reverse order from the second heating element and extending through the casing positioned around the upper baking member, and a cover pivotally mounted at one side on the casing enclosing the upper baking member and adapted to extend over said third heating element.

3. In an apparatus of the class described, a pair of pivotally connected waffle members, the upper waffle member being adapted to assume a substantially upright position when shifted relative to the lower waffle member, electric heating elements positioned against the outer sides of each of said waffle members and a cover pivotally mounted at one side of the heating element positioned against the upper waffle member and adapted to assume a position substantially at right angles thereto and, when the upper waffle member is positioned in a substantially upright position, to assume a substantially horizontal position.

4. In an apparatus of the class described, a lower baking member, an upper baking member pivotally connected at one side to one side of the former, casing members enclosing the outer sides of said baking members, an electric heating element positioned adjacent the under side of the lower baking member within the casing positioned therearound, a second similar heating element positioned adjacent the upper side of the upper baking member within the upper casing, a third heating element of similar construction to the first and second heating elements and positioned adjacent to and in reverse order from the second heating element and extending through the casing positioned around the upper baking member, and a cover pivotally mounted at its one side at one side of the heating element positioned against the upper waffle member and adapted to be secured over said latter heating element and also adapted to be latched in an open position substantially at right angles to said latter heating element.

5. In an apparatus of the class described, a lower waffle member, a casing enclosing the lower side of said waffle member, a heating element within said casing, an upper waffle member adapted to be positioned against the upper side of the lower waffle member, an upper casing enclosing the outer side of the upper waffle member, a heating means positioned within the upper casing against the upper waffle member and extending through said upper casing, an upwardly depressed cover pivotally mounted at its edge on the upper side of the upper casing at one side of the heating means on an axis parallel to the pivotal connection of said casing, latch means at the opposite side of said cover for securing said cover in a closed position over said heating means, and other latch means in connection with said cover at the pivotal portion thereof adapted to hold said cover in an open position relative to said heating means and in a substantially upright position relative thereto.

6. In an apparatus of the class described, a lower waffle member, a casing enclosing the lower side of said waffle member, a heating element within said casing, an upper waffle member adapted to be positioned against the upper side of the lower waffle member, an upper casing enclosing the outer side of the upper waffle member, a heating means positioned within the upper casing against the upper waffle member and extending through said upper casing, an upwardly depressed cover pivotally mounted at its edge on the upper side of the upper casing at one side of the heating means on an axis parallel to the pivotal connection of said casing, latch means at the opposite side of said cover for securing said cover in a closed position over said heating means, and other latch means in connection with said cover at the pivotal portion thereof adapted to hold said cover in an open position relative to said heating means and in a substantially upright position relative thereto, said cover assuming a substantially horizontal position when the upper casing is at its extreme open position relative to the lower waffle member.

7. In an apparatus of the class described, a lower waffle member, an upper waffle member pivotally connected relative to the former, an electric heating element mounted against the lower side of the lower waffle member, a second electric heating element mounted against the upper side of the upper waffle member, and a third electric heating element mounted against the second electric heating element, all of said electric heating elements being interchangeable with respect to each other.

In testimony whereof, I have hereunto set my hand at Los Angeles, California, this 6th day of December, 1927.

JOHN S. GUEST.